United States Patent
Mattox et al.

[15] 3,640,652
[45] Feb. 8, 1972

[54] LOCKING DEVICE FOR TIRE RETREADING MOLD

[72] Inventors: John R. Mattox, Route 3, Box 208-A, Charlotte, N.C. 28201; Thomas W. Mattox, 7205 Morley Circle, Charlotte, N.C. 28214

[22] Filed: Dec. 4, 1969

[21] Appl. No.: 882,058

Related U.S. Application Data

[63] Continuation-in-part of Ser. No. 736,783, June 13, 1968, Pat. No. 3,516,121.

[52] U.S. Cl. .............................................. 425/20
[51] Int. Cl. ........................................ B29h 5/04
[58] Field of Search .................................. 18/18 F

[56] References Cited

UNITED STATES PATENTS 3,516,121  6/1970  Mattox et al. .................. 18/18 F

*Primary Examiner*—J. Howard Flint, Jr.
*Attorney*—B. P. Fishburne, Jr.

[57] ABSTRACT

A single trunnion mounted power cylinder operates a low-friction wedge horizontally to exert a heavy clamping force along the true axis of the coupling shaft which connects the tire stand and overhead clamping ring or turret. The clamping ring or turret is pressed tightly against the mold matrix resting on the stand. The trunnions for the cylinder are supported on a lower bearing block beneath the wedge.

5 Claims, 5 Drawing Figures

PATENTED FEB 8 1972

INVENTORS
JOHN R. MATTOX
THOMAS W. MATTOX

BY B.P. Fishburn, Jr.

ATTORNEY

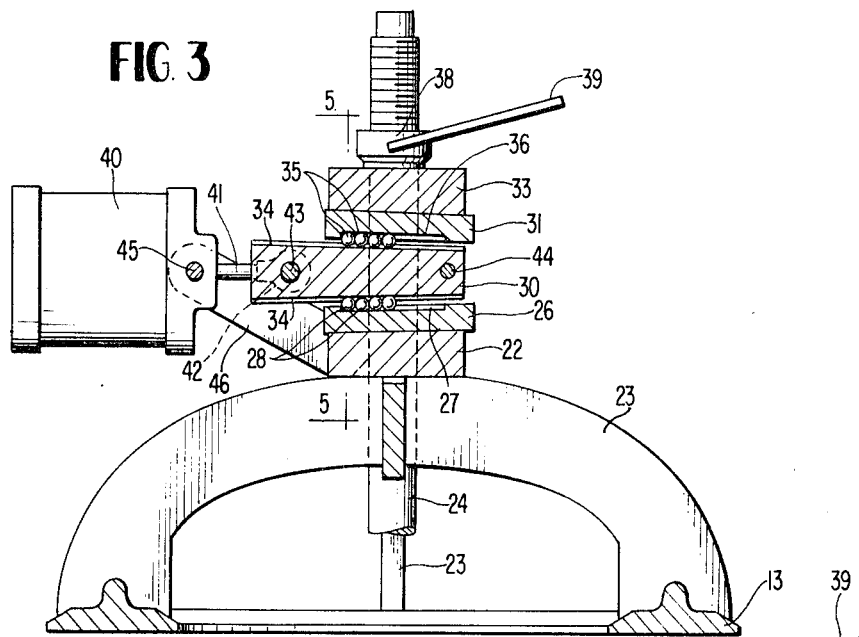
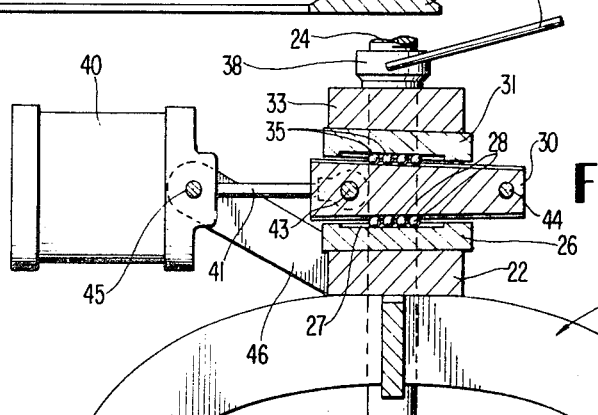
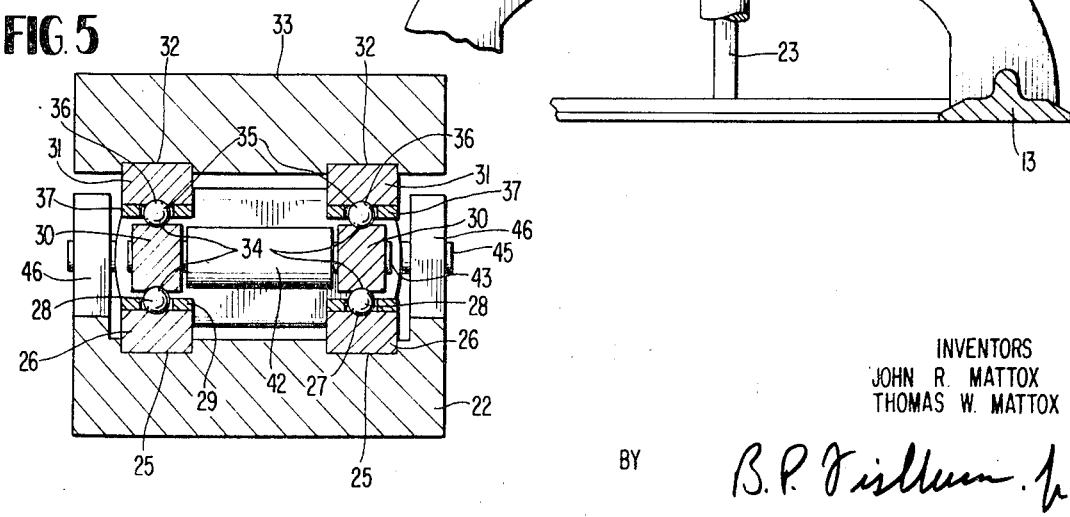

LOCKING DEVICE FOR TIRE RETREADING MOLD

This application is a continuation-in-part of prior copending application Ser. No. 736,783, filed June 13, 1968, for TIRE RETREADING MOLD APPARATUS HAVING LOCKING MEANS, now U.S. Pat. No. 3,516,121.

The general objective of the present invention is to improve upon and considerably simplify the locking structure in said prior application by eliminating a substantial number of parts and improving the efficiency of operation. The apparatus of the prior application embodied a roller wedge and a pair of power cylinders fore and aft of the wedge with the outer ends of the cylinders mounted upon extensions of the turret or clamping ring. In the present invention, a ball bearing wedge is employed to further reduce friction and only a single power cylinder is employed to operate this wedge. The power cylinder has trunnions which are supported on a pair of arms projecting from one side of the lower bearing block beneath the wedge. The geometry is such that the force from the cylinder is transmitted through the wedge along the centerline or axis of the clamping or coupling shaft which interconnects the stand and turret, as disclosed in said prior application. The invention herein is adaptable for use on the tire retreading apparatus disclosed in U.S. Pat. No. 3,240,653 to Mattox et al.

Other features and advantages of the invention will appear to those skilled in the art during the course of the following description.

BRIEF DESCRIPTION OF DRAWING FIGURES

FIG. 3 is a vertical section taken substantially on line 3—3 of FIG. 2 with the locking wedge retracted.

FIG. 4 is a similar sectional view showing the wedge extended for locking the mold.

FIG. 5 is an enlarged transverse vertical section taken on line 5—5 of FIG. 3.

DETAILED DESCRIPTION

Figure 1:
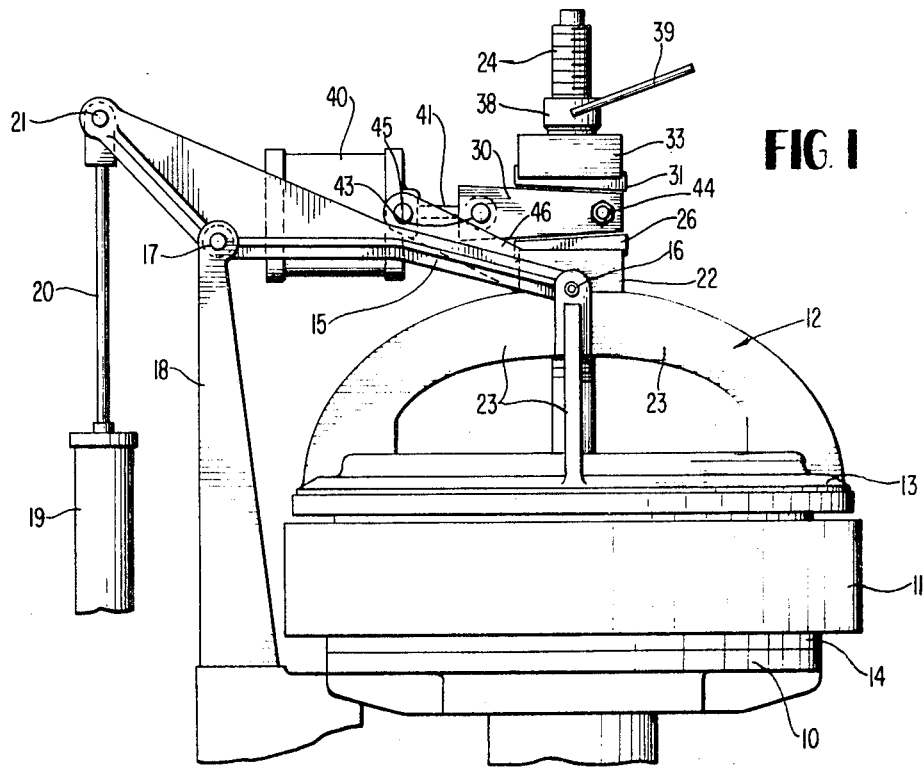
FIG. 1 is a side elevation of a tire retreading mold equipped with the improved locking means of the invention.
Figure 2:
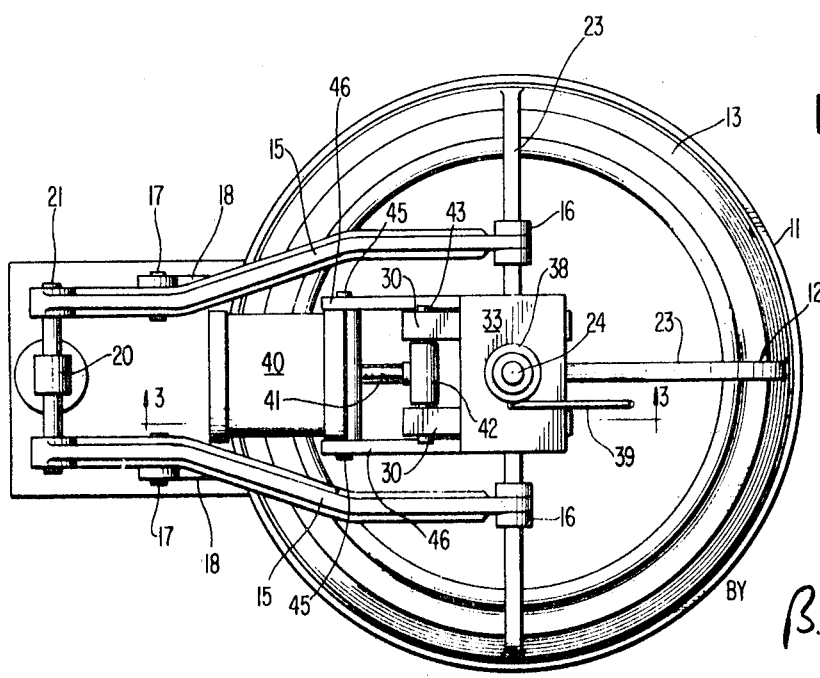
FIG. 2 is a plan view of the mold.

Referring to the drawings in detail, wherein like numerals designate like parts, the numeral 10 designates a floor-mounted base or stand adapted to support a conventional full circle retreading mold matrix 11. An overhead turret 12 has a lower clamping ring 13 to engage the upper side of the matrix and suitable insulating rings or plates are intervened between the matrix proper and the upper and lower clamping rings 13 and 14, as described in said prior application.

The turret 12 is bodily mounted on vertically swingable arms 15 whose forward ends are pivoted at 16 to the top of the turret structure. The arms 15 are further pivoted intermediate their ends as at 17 to upstanding posts 18 rigid with and rising above the underlying floor stand 10. The arms 15 are swung on the pivots 17 by a vertical power cylinder 19 whose rod 20 is pivoted at 21 to the rear ends of the lifting arms. By this arrangement, the turret 12 and clamping ring 13 is raised and lowered relative to the matrix 11, as described in the prior application and in the Mattox et al. U.S. Pat. No. 3,240,653.

The invention proper comprises a lower bearing block or plate 22 suitably rigidly anchored to spider arms 23 of the turret 12 and receiving therethrough vertically the coupling or clamping shaft 24 which couples detachably with a coupling block, not shown, inside of the pedestal of floor stand 10, as disclosed in said prior copending application and in the Mattox et al. patent. The lower bearing block 22 has parallel flat seating grooves 25 for hardened ball bearing plates 26, FIG. 5, each such plate having a raceway 27 for a plurality of ball bearings 28, such as four, although the number of ball bearings may be varied in some cases. Ball retainer plates 29 are also affixed to the upper surfaces of bearing plates 26 as shown in FIG. 5.

Coacting shallow tapered wedges 30 are arranged above the bearing plates 26 and between these plates and similar upper bearing plates 31, the latter being seated in flat grooves 32 formed in the bottom face of an upper bearing block 33. The top and bottom faces of the wedges 30 are grooved at 34 to receive the ball bearings 28 and similar sets of ball bearings 35 associated with the upper bearing plates 31 and rolling in grooves 36 thereof. Additional ball bearing retainers 37 are provided on the lower faces of the plates 31, as shown. Referring to FIG. 3 and FIG. 4, it may be observed that the grooves 27 and 36 are considerably longer than the space occupied by each group of balls and this clearance permits the wedges 30 to reciprocate freely horizontally without any tendency to bind and with the minimum of friction. Actually, as is apparent in FIGS. 3 and 4, the wedges travel twice the distance of movement of the ball bearings 28 and 35.

The top of coupling shaft 24 is screw-threaded and receives a manual clamping nut 38 having a handle 39 and this nut is utilized only for preliminary adjustment of the mold locking means and to take care of variations in thickness in the matrix 11, as this will vary for different tires.

A single power cylinder 40 is provided to reciprocate the wedges 30 and this cylinder may be hydraulic or pneumatic with conventional controls and has a reciprocatory piston rod 41 secured to a crosshead 42 between the wedges 30 and connected therewith by a cross-shaft or pin 43. The crosshead and pin 43 are located near the rear wider ends of the wedges 30, and the latter may be further interconnected for stability near their forward ends by a crossbolt 44.

The single cylinder 40 is bodily mounted or suspended on trunnions 45 supported within openings in a pair of sturdy support arms 46 disposed on opposite sides of the power cylinder and being inclined and rising upwardly from the lower bearing block 22 and integrally secured thereto. This simplified trunnion-type support for the power cylinder 40 is not only sturdy but causes the force exerted from the power cylinder on the wedges 30 to be transmitted to the clamping ring 13 as a true axial force along the centerline of the shaft 24. It should be clear in light of the drawings and above description that when the clamping nut 38 is adjusted to accommodate a matrix 11 of a certain thickness, forward movement of the wedges 30 will cause the clamping ring 13 to clamp the matrix 11 against the stand 10 evenly around the entire circumference of the matrix. Retraction of the wedges 30 will of course release the clamping force and when the coupling shaft 24 is uncoupled from the floor stand 10, the entire turret 12 may be raised through the pivoted arms 15 and under influence of power cylinder 19. The compression force generated by the wedges 30 is transmitted through the ball bearings 28 and 35 to the opposing bearing plates 26 and 31 and ultimately to the blocks 22 and 33. The block 33, being resisted by the nut 38, causes the resultant force from the wedges to be directed downwardly against the turret 12 and matrix 11. It is believed that the various features and advantages of the invention above described will now be apparent without further description.

It is to be understood that the form of the invention herewith shown and described is to be taken as a preferred example of the same, and that various changes in the shape, size and arrangement of parts may be resorted to, without departing from the spirit of the invention.

We claim:

1. In a tire retreading mold apparatus, a floor stand including a lower mold matrix clamping ring, a full circle tire retreading mold matrix resting on its side on said lower clamping ring and supported thereby, an overhead matrix clamping unit including an upper mold matrix clamping ring engageable with said retreading mold matrix and power means to raise and lower said clamping unit relative to the mold matrix and floor stand, a coupling shaft on said matrix clamping unit adapted to be coupled to a part of the floor stand so as to resist upward movement of the clamping unit, upper and lower vertically opposed bearing members on the coupling shaft and being seated on said clamping unit, a wedge device engaged between said bearing members and being shiftable relative to the bearing members and adapted to transmit a force through the bearing members axially of the coupling shaft, a support arm structure secured to the lower bearing member and projecting beyond one side thereof, a single power cylinder connected with the wedge device to reciprocate it transversely of the axis of the coupling shaft, and trunnion means for said single power cylinder carried by said support arm structure, whereby the single power cylinder is bodily supported near the bearing members in spaced relation to corresponding sides thereof.

2. The structure of claim 1, and said upper and lower bearing members comprising opposed bearing blocks and pairs of laterally spaced bearing plates seated within grooves of said blocks, said support arm structure comprising a pair of laterally spaced support arms secured rigidly to the lower bearing block.

3. The structure of claim 2, and rows of ball bearings intervened between opposing faces of the wedge device and said bearing plates, said opposing faces being grooved to accommodate the rows of ball bearings.

4. The structure of claim 3, and said wedge device comprising a pair of laterally spaced wedge elements, a crosshead extending transversely between corresponding ends of the wedge elements and pivotally connected thereto, and said single power cylinder having a piston rod pivotally coupled to the crosshead, said cylinder being pivotally supported by said trunnion means.

5. The structure of claim 1, and an adjustable nut on said coupling shaft above the upper bearing member.

* * * * *

Disclaimer 3,640,652.—*John R. Mattox* and *Thomas W. Mattox*, Charlotte, N.C. LOCKING DEVICE FOR TIRE RETREADING MOLD. Patent dated Feb. 8, 1972. Disclaimer filed Aug. 25, 1971, by the inventors.

Hereby disclaims the portion of the term of the patent subsequent to June 23, 1987.

[*Official Gazette May 22, 1973.*]